(12) United States Patent
Schaefer

(10) Patent No.: US 9,441,692 B2
(45) Date of Patent: Sep. 13, 2016

(54) PROXIMITY SENSOR FOR BRAKE WEAR DETECTION

(75) Inventor: Craig Schaefer, Granger, IN (US)

(73) Assignee: Honeywell International Inc., Morris Plains, NJ (US)

( * ) Notice: Subject to any disclaimer, the term of this patent is extended or adjusted under 35 U.S.C. 154(b) by 1626 days.

(21) Appl. No.: 12/258,010

(22) Filed: Oct. 24, 2008

(65) Prior Publication Data

US 2009/0229926 A1 Sep. 17, 2009

Related U.S. Application Data

(60) Provisional application No. 61/035,713, filed on Mar. 11, 2008.

(51) Int. Cl.
F16D 66/02 (2006.01)

(52) U.S. Cl.
CPC .................................. F16D 66/025 (2013.01)

(58) Field of Classification Search
CPC ................................................... F16D 66/025
USPC .... 188/1.11 L, 1.11 E, 1.11 W, 71.5; 73/121, 73/128, 129; 340/454, 453
See application file for complete search history.

(56) References Cited

U.S. PATENT DOCUMENTS

| | | | | |
|---|---|---|---|---|
| 2,522,181 A | * | 9/1950 | Krikorian | 188/196 B |
| 3,604,865 A | * | 9/1971 | Bricker | 200/61.4 |
| 4,013,143 A | * | 3/1977 | Juhasz | 188/1.11 L |
| 4,107,604 A | * | 8/1978 | Bernier | 324/207.2 |
| 4,184,145 A | * | 1/1980 | Fima | 340/454 |
| 4,279,214 A | * | 7/1981 | Thorn | 116/208 |
| 4,495,464 A | * | 1/1985 | Kozai et al. | 324/174 |
| 4,520,661 A | * | 6/1985 | Tamai et al. | 188/1.11 L |
| 4,550,815 A | * | 11/1985 | Gale | 192/30 W |
| 4,583,071 A | * | 4/1986 | Sebalos et al. | 340/453 |
| 4,642,603 A | * | 2/1987 | Martinez, Jr. | 340/453 |
| 4,664,239 A | * | 5/1987 | Symes et al. | 477/167 |
| 4,757,300 A | * | 7/1988 | Sebalos | 340/454 |
| 4,776,438 A | * | 10/1988 | Schandelmeier | 188/1.11 W |
| 4,852,404 A | * | 8/1989 | Catanese | 73/319 |
| 4,855,712 A | * | 8/1989 | Wiley et al. | 340/453 |
| 4,989,537 A | * | 2/1991 | Hutchinson et al. | 116/208 |
| 5,035,303 A | * | 7/1991 | Sullivan | 188/1.11 W |
| 5,044,302 A | * | 9/1991 | Goldfein et al. | 116/208 |
| 5,087,907 A | * | 2/1992 | Weiler et al. | 340/454 |
| 5,125,280 A | * | 6/1992 | Koscinski et al. | 74/89.4 |
| 5,148,107 A | | 9/1992 | Finger et al. | |
| 5,228,541 A | * | 7/1993 | Plude | 188/1.11 W |
| 5,251,729 A | * | 10/1993 | Nehl et al. | 188/266.1 |
| 5,255,760 A | * | 10/1993 | Lamb et al. | 188/1.11 L |

(Continued)

FOREIGN PATENT DOCUMENTS

DE 32 20 773 A1 12/1983
DE 10 2005 013142 A1 9/2006

(Continued)

*Primary Examiner* — Thomas J Williams
(74) *Attorney, Agent, or Firm* — Shumaker & Sieffert, P.A.

(57) ABSTRACT

A proximity sensor 20, 21, 22 and method for detection of wear in a brake disc stack 55 on an aircraft including a wear pin 40, 43, 50 for moving in a first direction as the brake wears, and a switch 20, 21, 22 for measuring movement of the wear pin in the first direction. When the wear pin 40, 43, 50 moves in the first direction to a predetermined position, the switch 20, 21, 22 signals that the brake disc stack 55 has worn the predetermined amount.

20 Claims, 5 Drawing Sheets

(56) References Cited

U.S. PATENT DOCUMENTS

| | | | | |
|---|---|---|---|---|
| 5,255,761 | A * | 10/1993 | Zaremsky | 188/71.5 |
| 5,310,023 | A * | 5/1994 | Martinez | 188/1.11 L |
| 5,327,782 | A * | 7/1994 | Sato et al. | 73/129 |
| 5,410,293 | A * | 4/1995 | Angerfors | 188/1.11 L |
| 5,433,296 | A * | 7/1995 | Webberley | 188/1.11 L |
| 5,450,930 | A * | 9/1995 | Martens et al. | 188/1.11 L |
| 5,474,154 | A * | 12/1995 | Coale | 188/1.11 L |
| 5,494,138 | A * | 2/1996 | Scelsi et al. | 188/18 A |
| 5,717,174 | A * | 2/1998 | Ramos | 187/288 |
| 5,767,768 | A * | 6/1998 | DiSaverio | 340/454 |
| 5,825,287 | A * | 10/1998 | Zarybnicky et al. | 340/453 |
| 5,848,672 | A * | 12/1998 | Brearley et al. | 188/1.11 L |
| 5,906,253 | A | 5/1999 | Rancourt et al. | |
| 5,934,415 | A * | 8/1999 | Preston et al. | 188/1.11 L |
| 5,967,266 | A * | 10/1999 | Carnegie | 188/1.11 L |
| 6,003,640 | A * | 12/1999 | Ralea | 188/71.5 |
| 6,112,859 | A * | 9/2000 | Shuck et al. | 188/1.11 L |
| 6,202,811 | B1 * | 3/2001 | Wallrafen | 192/30 W |
| 6,237,723 | B1 * | 5/2001 | Salsman | 188/1.11 W |
| 6,328,144 | B1 * | 12/2001 | Hayakawa et al. | 188/299.1 |
| 6,352,137 | B1 * | 3/2002 | Stegall et al. | 188/1.11 L |
| 6,356,072 | B1 * | 3/2002 | Chass | 324/207.2 |
| 6,411,206 | B1 * | 6/2002 | Weant et al. | 340/479 |
| 6,460,659 | B1 * | 10/2002 | Schaffer et al. | 188/1.11 W |
| 6,634,465 | B1 * | 10/2003 | Tuschen | 188/1.11 L |
| 6,696,937 | B1 * | 2/2004 | Kiefer | 340/453 |
| 6,702,069 | B2 * | 3/2004 | Ralea et al. | 188/71.5 |
| 6,719,102 | B2 * | 4/2004 | Takanashi | 188/1.11 L |
| 6,753,771 | B2 * | 6/2004 | Lesesky | 340/479 |
| 6,776,266 | B2 * | 8/2004 | Fuglewicz et al. | 188/1.11 E |
| 6,929,333 | B2 * | 8/2005 | DeVlieg | 303/20 |
| 7,014,016 | B2 * | 3/2006 | Morris et al. | 188/1.11 W |
| 7,086,503 | B2 * | 8/2006 | Miller et al. | 188/1.11 L |
| 7,108,107 | B2 * | 9/2006 | Ralea et al. | 188/1.11 L |
| 7,114,596 | B2 | 10/2006 | Borugian | |
| 7,322,447 | B2 * | 1/2008 | Deckhut et al. | 188/1.11 L |
| 7,525,062 | B2 * | 4/2009 | Adam et al. | 200/600 |
| 7,535,131 | B1 * | 5/2009 | Safieh, Jr. | 307/134 |
| 7,610,998 | B2 * | 11/2009 | Baumgartner et al. | 188/72.9 |
| 7,673,721 | B2 * | 3/2010 | Bailey et al. | 188/1.11 L |
| 7,766,130 | B2 * | 8/2010 | Walker et al. | 188/1.11 W |
| 2004/0251090 | A1 * | 12/2004 | Morris et al. | 188/1.11 L |
| 2005/0269873 | A1 * | 12/2005 | DeVlieg | 303/122.03 |
| 2006/0042734 | A1 * | 3/2006 | Turner et al. | 152/154.2 |
| 2006/0108182 | A1 * | 5/2006 | Walker et al. | 188/1.11 W |
| 2006/0191751 | A1 * | 8/2006 | Miller et al. | 188/1.11 L |
| 2006/0219487 | A1 * | 10/2006 | Wille et al. | 188/1.11 L |
| 2007/0125607 | A1 | 6/2007 | Ralea et al. | |
| 2008/0073161 | A1 * | 3/2008 | Pettersson et al. | 188/1.11 L |
| 2008/0190712 | A1 * | 8/2008 | Hagberg | 188/1.11 L |
| 2008/0202865 | A1 * | 8/2008 | Pradier et al. | 188/1.11 W |
| 2009/0050418 | A1 * | 2/2009 | Vargas et al. | 188/1.11 L |
| 2009/0120735 | A1 * | 5/2009 | DeVlieg | 188/1.11 L |
| 2009/0177362 | A1 * | 7/2009 | Schmitt et al. | 701/70 |
| 2009/0205910 | A1 * | 8/2009 | Cahill | 188/1.11 L |
| 2010/0286881 | A1 * | 11/2010 | Cahill | 701/70 |

FOREIGN PATENT DOCUMENTS

| | | |
|---|---|---|
| EP | 1 538 364 A1 | 6/2005 |
| FR | 2874675 A1 * | 3/2006 |
| GB | 2 302 574 A | 1/1997 |

* cited by examiner

PROXIMITY SENSOR FOR BRAKE WEAR DETECTION

CROSS REFERENCE TO RELATED APPLICATIONS

The present application claims the benefit of U.S. Provisional Patent Application No. 61/035,713 filed Mar. 11, 2008, the entire contents of which is hereby incorporated by reference.

FIELD OF THE INVENTION

This invention relates to an apparatus and method for detecting brake wear. The apparatus and method of the present invention is especially suitable for detecting brake wear in aircraft landing systems.

BACKGROUND OF THE INVENTION

Typically, to sense wear in aircraft brakes, a manual means is used to detect brake wear. In one known device, a steel rod passes through the bracket via a hole in the bracket. The amount of displacement that the steel rod moves, as it protrudes from the bracket, in relation to the steel rod's initial position corresponds with the amount of wear that has occurred on the brake disc stack. The brake disc stack is composed of a plurality of rotors and stators. The length of the steel rod protruding from the bracket corresponds with the brake disc stack height. As the brakes are used, the brake disc stack is worn. A person with a ruler or a linear variable differential transformer (LVDT) sensor measures the length of the steel rod in order to determine if the brake disc stack is to be replaced. The ruler or LVDT sensor is used to manually measure the length of the steel rod. Each brake disc stack of an aircraft, which numbers approximately 2 to 20, must be measured manually. The process of measuring the steel rods manually is labor intensive, costly, time consuming and cannot be performed remotely.

SUMMARY OF THE INVENTION

In contrast, one embodiment of this invention is an apparatus comprising a wear pin, the wear pin moving in a first direction as the brake wears, and a switch for measuring movement of the wear pin in the first direction, wherein when the wear pin moves in the first direction to a predetermined position, the switch signals that the brake has worn a predetermined amount.

Another embodiment of the present invention is a method comprising steps of moving a wear pin in a first direction as the brake wears, and measuring the movement of the wear pin in the first direction by a switch, wherein when the wear pin moves in the first direction to a predetermined position, the switch signals that the brake disc stack has worn a predetermined amount.

BRIEF DESCRIPTION OF THE DRAWING

The present invention will be more fully understood by reference to the detailed description given hereinbelow and to the accompanying drawings. The drawings are not to scale, and are provided by way of illustration only. The drawings do not in any way limit the present invention.

DETAILED DESCRIPTION OF THE INVENTION

Figure 1:
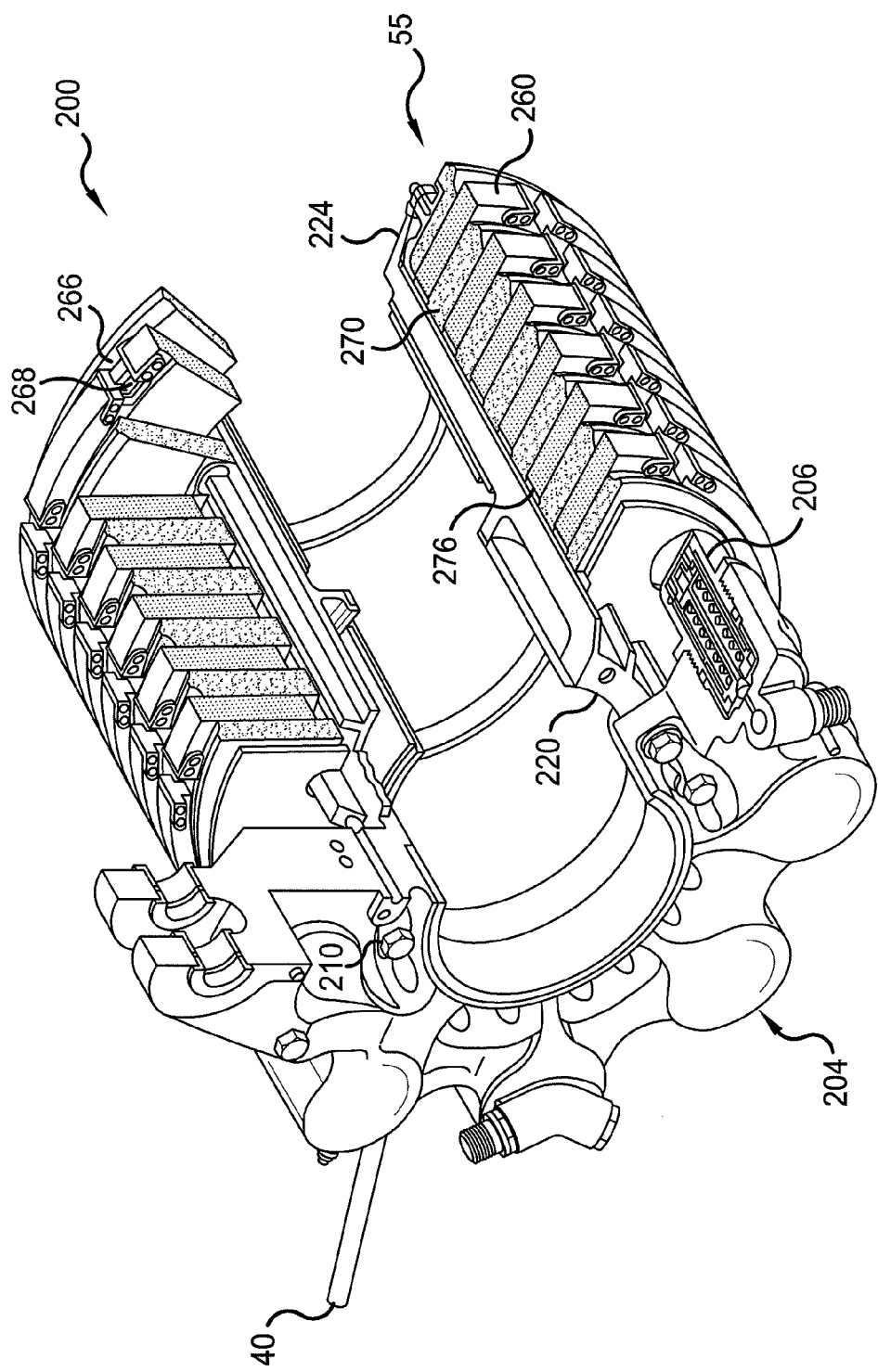
FIG. 1 is a drawing of an example aircraft carbon brake having an example proximity sensor, examples of which are shown in detail in FIGS. 2-4.

FIG. 1 is a drawing of an example aircraft carbon brake 200 having an example proximity sensor. The example aircraft carbon brake 200 includes a piston housing 204 having a plurality of hydraulic pistons 206 located about the circumference of the piston housing 204. A plurality of circumferentially spaced bolts 210 attaches the piston housing 204 to a torque tube 220. The torque tube 220 extends horizontally from the piston housing 204 to a backing plate 224. Located about the torque tube 220 and between the pistons 206 and the backing plate 224 is a plurality of friction material discs. The friction material discs form an example stack of brake discs, commonly made of carbon. The brake disc stack 55 is also known as a heat stack. The stack of discs is, alternately, composed of rotors and stators. An example of the brake disc stack 55 includes five stator discs 270 and six rotor discs 260.

Each of the rotor discs 260 of the illustrated example includes a plurality of spaced-apart slots 266 in its outer circumference. Each of the spaced-apart slots 266 includes a metal insert 268. The spaced-apart slots 266 and the metal inserts 268 receive drive keys (not shown) made an integral part of the aircraft wheel (not shown). In a similar manner, the example stator discs 270 include at their inner diameter a plurality of spaced-apart slots 276.

Figure 2:
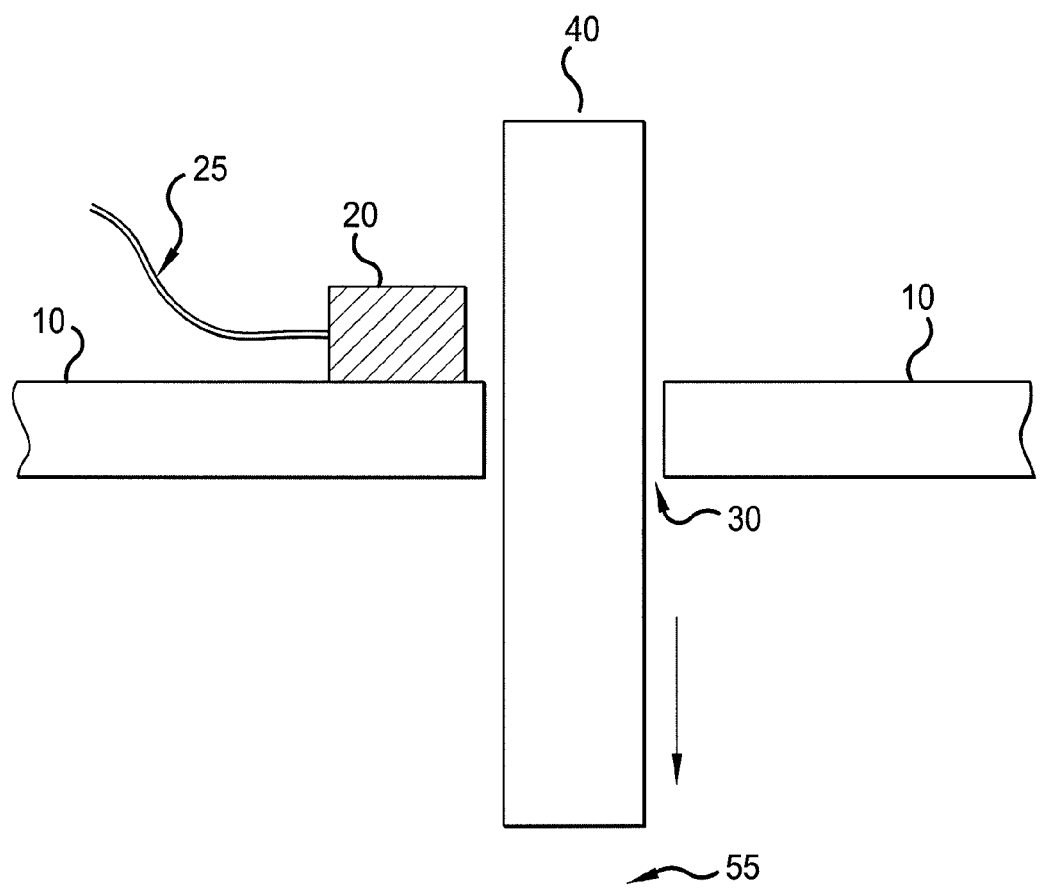
FIG. 2 is a cross-sectional drawing showing a proximity sensor for brake wear detection according to an embodiment of the present invention.

The torque tube is indirectly attached to the landing gear for an aircraft. The rotors are attached to the wheels and rotate around the same center line as the wheels. As pressure is applied to the piston housing, the piston housing is extended to compress the stack of brake discs. This compression of the brake disc stack creates friction to slow the wheels of the landing gear, allowing the aircraft to stop. As the brake discs are used, the friction causes the brake discs to lose mass. For example, a new or refurbished stack of brakes discs may begin at 10 inches in height and when the brake stack is effectively worn, the brake disc stack may be 8½ inches in height. If the brake disc stack is worn to a height smaller than 8½ inches then additional problems arise such as excessive heat generation due to a reduced mass of carbon. The excessive heat degrades the friction material FIG. 2 shows a first embodiment of a braking system which includes a sensor known as a reed switch 20 mounted on a bracket 10. The reed switch senses the location of a wear pin 40 or steel rod. The wear pin 40 passes through a hole 30 in the bracket 10 near brake disc stack 55. The wear pin 40 is used to measure the height of the brake disc stack 55. The location of the wear pin 40 corresponds with the height of the brake disc stack 55 and the wear of the brake disc stack 55. The wear pin 40 is magnetized so that a reed switch 20 can detect its presence. The reed switch 20 may be located on the outer surface of the bracket 10 while the brake disc stack 55 is located inside the inner surface of the bracket so that the reed switch 20 is oriented to measure the presence of the wear pin 40 protruding outside of the bracket 10. The reed switch 20 is securely fastened to the bracket 10 with the reed switch 20 located on the side of the bracket 10 opposite of the brake disc stack 55; however, the reed switch 20 may also be located on the same side of the bracket 10 as the brake disc stack 55. The reed switch 20 can be located anywhere that it can be securely fastened as long as it is located close enough to detect the presence of the wear pin 40.

The reed switch 20 may be any induction-type switch and does not need to physically come in contact with the wear pin 40. The wear pin 40 is made out of, for example, magnetized steel or any material capable of being magnetized so that it can be detected by a sensor, such as a reed switch 20. The reed switch 20 detects the presence of the wear pin 40 when located at a predetermined distance or closer. The reed switch 20 may be configured so that when the brake disc stack 55 stack is worn to a predetermined height, the wear pin will no longer be sensed by the reed switch. In other words, the brake disc stack 55 has decreased a predetermined amount. Alternatively, while the wear pin is being detected, the reed switch senses that the wear pin has not moved to the predetermined position. The sensor may also be configured so that it measures the distance that the wear pin 40 moves from an initial position. The reed switch 20 is oriented so that as the outer distal end of the wear pin 40 moves toward the bracket 10, the reed switch 20 detects whether or not the wear pin has reached a predetermined position. Once the wear pin 40 reaches a predetermined distance away from the reed switch 20 at the predetermined position, the reed switch 20 can activate a signal through a wire 25 because the reed switch 20 can no longer sense the magnetic field of the wear pin 40. Alternatively, the reed switch 20 may be configured to deactivate a signal once the wear pin 40 reaches the predetermined position.

The predetermined position can be set to when the brake disc stack 55 needs to be replaced or set to when just before the brake disc stack 55 needs to be replaced and the brake disc stack 55 needs to be closely monitored. The predetermined position can also be set to any arbitrary position. The reed switch 20 may be electrically connected to the dashboard of a cockpit to alert a member of the crew or the pilot when the brake disc stack 55 has worn a predetermined amount or connected to electronic diagnostic systems. For example, the reed switch 20 could be set activate a light in the cockpit of an airplane when the wear pin 40 measures a brake disc stack of, in one exemplary implementation, 8½ inches instead of an initial 10 inch height of the brake disc stack. In other words, when the wear pin move 1½ inches to the predetermined position, a warning light, for example, may be activated to alert someone that the brake disc stack 55 is effectively worn or about to be effectively worn and it is time to replace the discs of the brake disc stack.

The reed switch 20 may be replaced by a photo-optical sensor, which senses when the wear pin 40 moves to a predetermined position, using a beam of light instead of magnetic induction, and sends a signal as soon as the wear pin 40 reaches the predetermined position. Alternatively, the reed switch 20 may be replaced by a sonic sensor, which senses when the wear pin 40 reaches a predefined height using a beam of sound instead of magnetic induction. The sonic sensor sends a signal as soon as the wear pin 40 reaches a predetermined position. The photo-optical and sonic sensors are positioned so that the wear-pin obstructs the transmission of light or sound, and when the obstruction no longer exists, then the sensor is activated. These sensors are positioned so that they are activated after the wear pins moves a predetermined distance and reaches a predetermined position indicating that the brake disk stack has worn a predetermined amount.

The wear pin 40 detects that brake disc stack 55 has worn a predetermined amount by detecting that the wear pin reaches a predetermined position. As the brake disc stack 55 becomes smaller in height the wear pin 40 moves toward the brake disc stack 55 and the distal end of the wear pin moves towards the bracket 10 until the distal end is at the same level as the bracket 10 and subsequently as the brake disc stack 55 continues to decreases in height then the distal end of the wear pin 40 moves away from the bracket 10. The reed switch 20 detects the presence of the wear pin 40 until the wear pin can no longer be sensed. Any sensor that can detect the absence and presence of a wear pin 40 may be used.

A wire is connected to the reed switch 20, which can carry a signal to warn that the movement of the wear pin 40 has exceeded the predefined limit, which corresponds to the brake disc stack 55 being worn. When the wear pin 40 reaches the predetermined position, the reed switch 20 signals the cockpit that the brake disc stack 55 needs to be replaced, is about to be replaced or any other useful status.

The reed switch 20 may initially be configured to be active sending a warning and the reed switch 20 deactivates the warning when the reed switch 20 no longer senses the wear pin 40; however, the reed switch may also be configured to be inactive while the reed switch senses the wear pin 40 and activates itself when the reed switch 20 no longer senses the wear pin 40.

Figure 3:
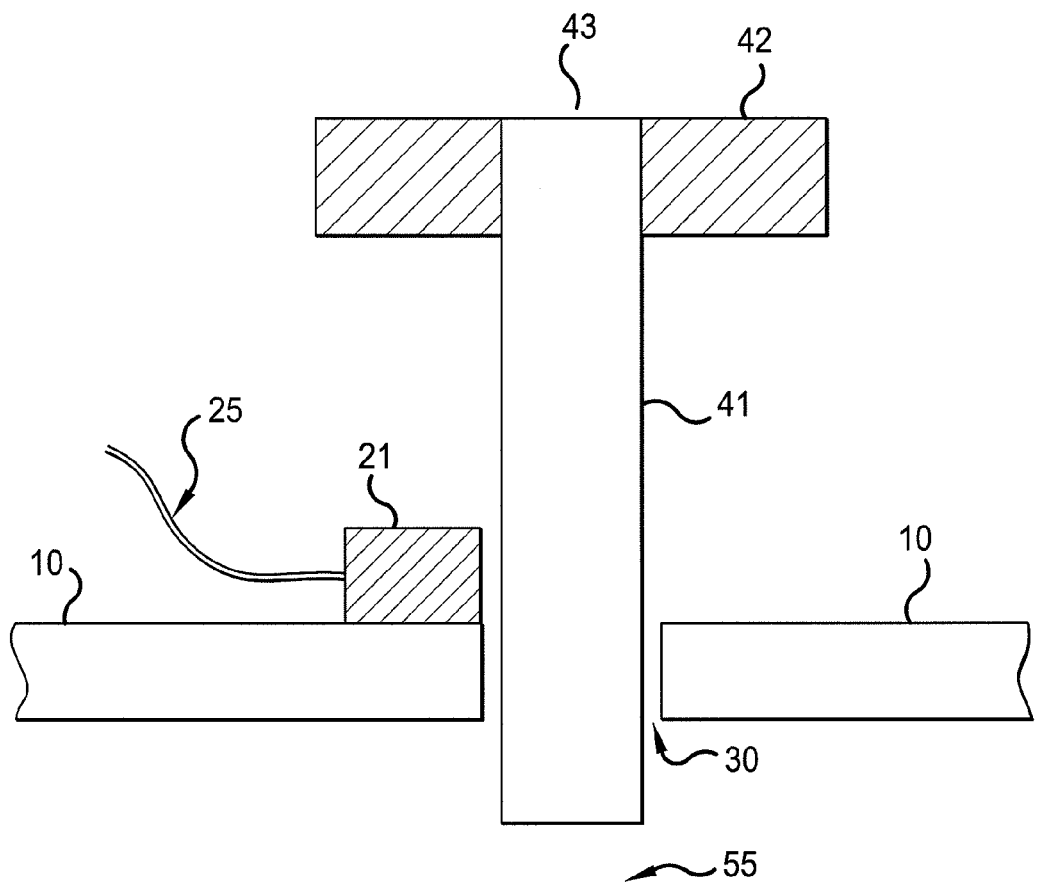
FIG. 3 is a cross-sectional drawing showing a proximity sensor for brake wear detection according to another embodiment of the present invention.

FIG. 3 shows another embodiment of the present invention. A bracket 10 with a sensor, such as a reed switch 21, measures movement of a wear pin 43 as the height of brake disc stack 55 decreases. The wear pin 43 includes a magnet 42 on the distal end of the pin away from brake disc stack 55 while the body 41 of the wear pin is not magnetized. The magnet 42 may be connected to the wear pin 43 via a friction lock. The reed switch 21 is oriented to sense when the magnet on the wear pin moves close enough to the switch to be sensed. The reed switch 21 faces away from the brake disc stack 55 and as brake disc stack 55 decreases in height, the magnet 42 moves closer to the reed switch 20. When the reed switch 21 senses that the magnet has moved to a predetermined position near the reed switch, the reed switch 21 signals that brake disc stack 55 has been worn a predetermined amount. For example, a light in the cockpit may light up indicating that the brake disc stack 55 is worn. A magnet 42 is placed on the distal end of the wear pin 43 so that the worn stack of brake discs indicates when a side of the magnet 42 is located a predetermined position in relation to the reed switch 21. Alternatively, the light in the cockpit could be on initially and when the wear pin is sensed the light could be turned off. The reed switch 21 may be positioned so that when the magnet 42 is not being sensed at a predetermined position, the switch 21 sends a signal indicating that the brake disc stack 55 has not been worn a predetermined amount.

The difference between the first embodiment and the second embodiment is orientation of the sensor. In the second embodiment, the reed switch 21 determines when the magnet 42 reaches a predetermined position. The magnet 42 moves as the brake disc stack 55 decreases in height while the reed switch 20 of the first embodiment is oriented to activate a signal when the wear pin 40 reaches a predetermined position in relation to the switch 20.

Figure 4:
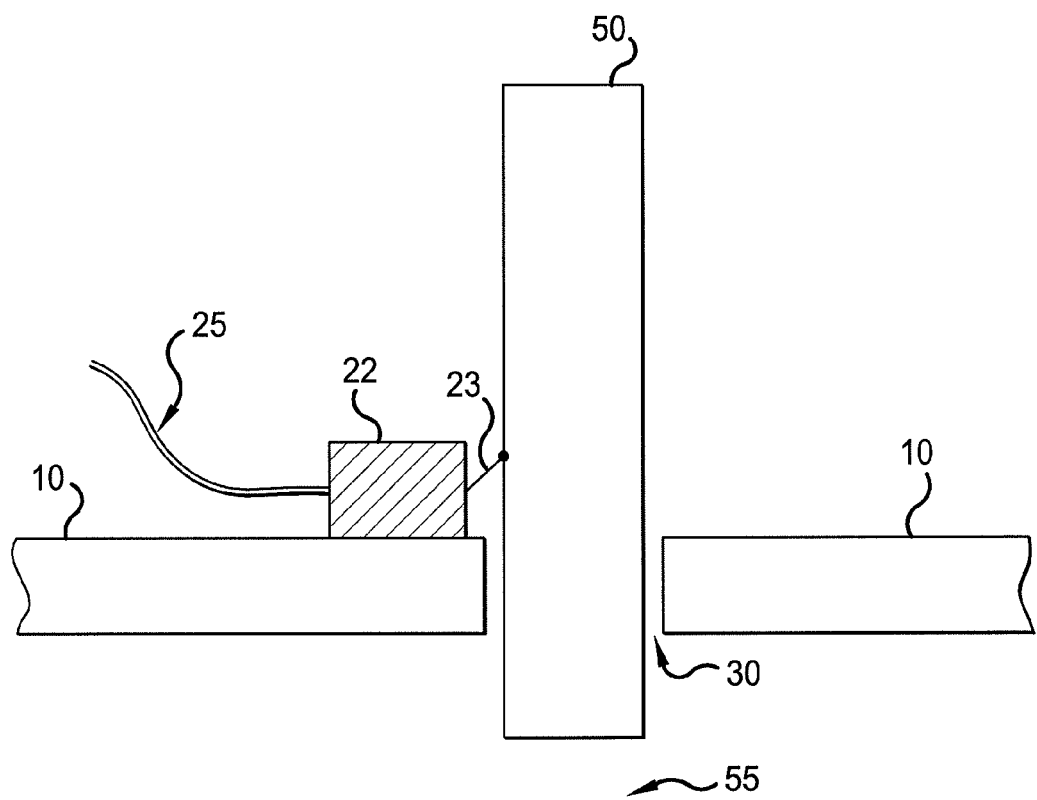
FIG. 4 is a cross-sectional drawing showing a proximity sensor for brake wear detection according to another embodiment of the present invention.

FIG. 4 shows a third embodiment of the present invention. FIG. 4 includes a wear pin 50, a bracket 10 and a sensor 22. The sensor 22 is physically touching the wear pin 50 to measure its movement, such as a micro switch 22. The micro switch 22 includes as arm 23 that moves as the wear pin 50 moves. The amount the arm 23 moves corresponds to the change in height of the brake disc stack. As the brake disc stack 55 wears down, the micro switch 22 detects that the wear pin is moving in a direction that corresponds with the decrease in height of the brake disc stack 55. Upon moving to a predetermined position, the micro switch 22 sends a warning signal indicating that the height of the brake disc stack 55 has decreased a predetermined amount.

The difference between the third embodiment and the first and second embodiments is that the micro switch 22 of the third embodiment is physically touching the wear pin 50 while in the first and second embodiments, the reed switch does not touch the wear pin or the magnet attached to the wear pin.

Figure 5:
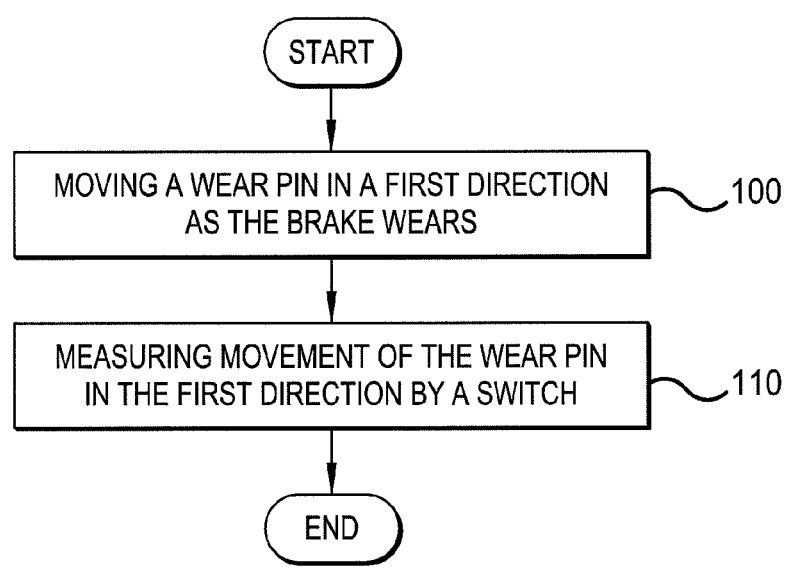
FIG. 5 is a flow chart showing an embodiment of a method for detection of wear in a brake disc stack in an aircraft.

A method for detection of wear in a brake disc stack in an aircraft is illustrated in FIG. 5. This method includes moving a wear pin 40, 43, 50 in a first direction as brake disc stack 55 wears at step 100, and measuring movement of the wear pin 40, 43, 50 in the first direction by a switch at step 110. When the wear pin 40, 43, 50 moves in the first direction to a predetermined position, the switch signals that the brake disc stack 55 has worn the predetermined amount.

While the present invention has been described with respect to a detailed example of its implementation, the invention is capable of numerous modifications, rearrangements, and alterations, and such are intended to be within the spirit and scope of the disclosure and claims.

What is claimed is:

1. A proximity sensor for detection of wear in a brake disc stack on an aircraft, the proximity sensor comprising:
    a bracket;
    a wear pin configured to move in a first direction through a hole defined by the bracket as the brake disc stack wears; and
    a switch configured to detect movement of the wear pin in the first direction, wherein the switch is configured to be in a first state until the wear pin moves in the first direction to a predetermined position, and when the wear pin moves in the first direction to the predetermined position, the switch changes from the first state to a second state in which the switch indicates that the brake disc stack has worn a predetermined amount, and wherein the switch is mounted on the bracket.

2. The proximity sensor of claim 1, wherein the wear pin includes a steel rod.

3. The proximity sensor of claim 2, wherein the steel rod is magnetized.

4. The proximity sensor of claim 1, wherein the wear pin includes a body, a magnet located on a distal end of the wear pin away from the brake disc stack and the body is not magnetized.

5. The proximity sensor of claim 1, wherein the switch comprises an induction-type switch.

6. The proximity sensor of claim 1, wherein the switch comprises a micro switch that physically touches the wear pin.

7. The proximity sensor of claim 1, wherein the switch remotely signals a cockpit of the aircraft when the wear pin moves in the first direction to the predetermined position.

8. The proximity sensor of claim 1, wherein the switch comprises a photo-optical sensor.

9. The proximity sensor of claim 1, wherein the switch comprises a sonic sensor.

10. The proximity sensor of claim 4, wherein the switch is configured to measure movement of the wear pin in the first direction by sensing that the magnet has moved to the predetermined position that corresponds to the predetermined amount of wear of the brake disc stack.

11. The proximity sensor of claim 1, wherein the switch is configured to detect a presence of the wear pin, and the wear pin and switch are configured such that, when the wear pin moves in the first direction to the predetermined position, the switch no longer detects the presence of the wear pin, and generates an indication that the brake disc stack has worn the predetermined amount.

12. The proximity sensor of claim 1, wherein a distal end of the wear pin away from the brake disc stack moves towards the switch as the wear pin moves in the first direction as the brake disc stack wears.

13. A method for detection of wear in a brake disc stack on an aircraft, the method comprising:
    detecting movement of a wear pin in a first direction with a switch, wherein the wear pin is configured to move in the first direction through a hole defined by a bracket as the brake disc stack wears, and wherein the switch is mounted on the bracket; and
    indicating, via the switch, that the brake disc stack has worn a predetermined amount when the wear pin moves in the first direction to a predetermined position, wherein the switch is configured to be in a first state until the wear pin moves in the first direction to the predetermined position, and when the wear pin moves in the first direction to a predetermined position, the switch changes from the first state to a second state in which the switch indicates that the brake disc stack has worn the predetermined amount.

14. The method of claim 13, wherein the wear pin comprises a steel rod.

15. The method of claim 14, wherein the steel rod is magnetized.

16. The method of claim 13, wherein the wear pin includes a body and a magnet located on a distal end of the wear pin away from the brake disc stack, wherein the body is not magnetized.

17. The method of claim 13, wherein the switch comprises an induction-type switch.

18. The method of claim 13, wherein the switch comprises a micro switch that physically touches the wear pin.

19. The method of claim 13, further comprising remotely signaling a cockpit of the aircraft when the wear pin moves in the first direction to the predetermined position.

20. The method of claim 13, wherein the switch comprises a photo-optical sensor or a sonic sensor.

* * * * *